(12) United States Patent
Johnson et al.

(10) Patent No.: US 6,202,976 B1
(45) Date of Patent: Mar. 20, 2001

(54) PLASTIC REARVIEW MIRROR MOUNT

(75) Inventors: Timothy M. Johnson, Leo, IN (US); Joseph Bruce, Rochester Hills, MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/167,561

(22) Filed: Oct. 7, 1998

(51) Int. Cl.$^7$ ........................................................ A47G 1/24
(52) U.S. Cl. .............................. 248/476; 248/478; 359/872
(58) Field of Search .................................. 248/476, 478, 248/481, 549, 475.1, 225.11, 222.11; 359/872, 876, 871

(56) References Cited

U.S. PATENT DOCUMENTS

| | | | |
|---|---|---|---|
| 4,435,042 | 3/1984 | Wood et al. | 350/281 |
| 4,524,941 | 6/1985 | Wood et al. | 248/544 |
| 4,632,348 | * 12/1986 | Keesling et al. | 248/222.1 |
| 4,645,316 | * 2/1987 | Ohyama | 350/632 |
| 4,930,742 | 6/1990 | Schofield et al. | 248/475.1 |
| 4,995,581 | 2/1991 | Koiwai et al. | 248/480 |
| 5,100,095 | 3/1992 | Haan et al. | 248/549 |
| 5,151,828 | * 9/1992 | Sugimura | 359/871 |
| 5,221,068 | 6/1993 | Varner et al. | 248/231.4 |
| 5,377,948 | 1/1995 | Suman et al. | 248/549 |
| 5,377,949 | 1/1995 | Haan et al. | 248/549 |
| 5,487,522 | 1/1996 | Hook | 248/549 |
| 5,587,236 | 12/1996 | Agrawal et al. | 428/334 |
| 5,589,026 | 12/1996 | Perecman | 156/286 |
| 5,680,263 | 10/1997 | Zimmerman et al. | 359/872 |

* cited by examiner

Primary Examiner—Ramon O Ramirez
Assistant Examiner—Kimberly Wood
(74) Attorney, Agent, or Firm—Nixon & Vanderhye P.C.

(57) ABSTRACT

A plastic button for use in a rearview mirror mounting system. The plastic (e.g. polymer or polycarbonate) buttons holds tighter tolerances than conventional metal buttons. Additionally, it has improved flatness characteristics. No metal grinding is required to make the plastic buttons, which may be injection molded. Furthermore, the coefficient of expansion is satisfactory in view of a flexible adhesive utilized, and the button manufacturing process is cheaper than for conventional metal buttons.

14 Claims, 2 Drawing Sheets

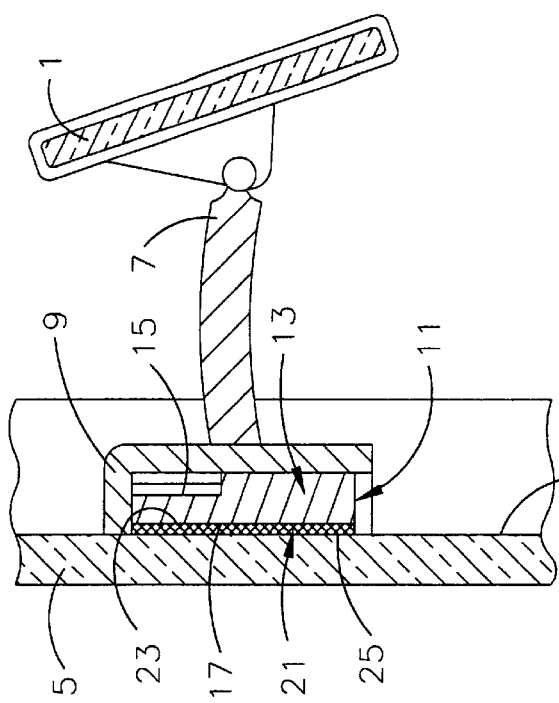
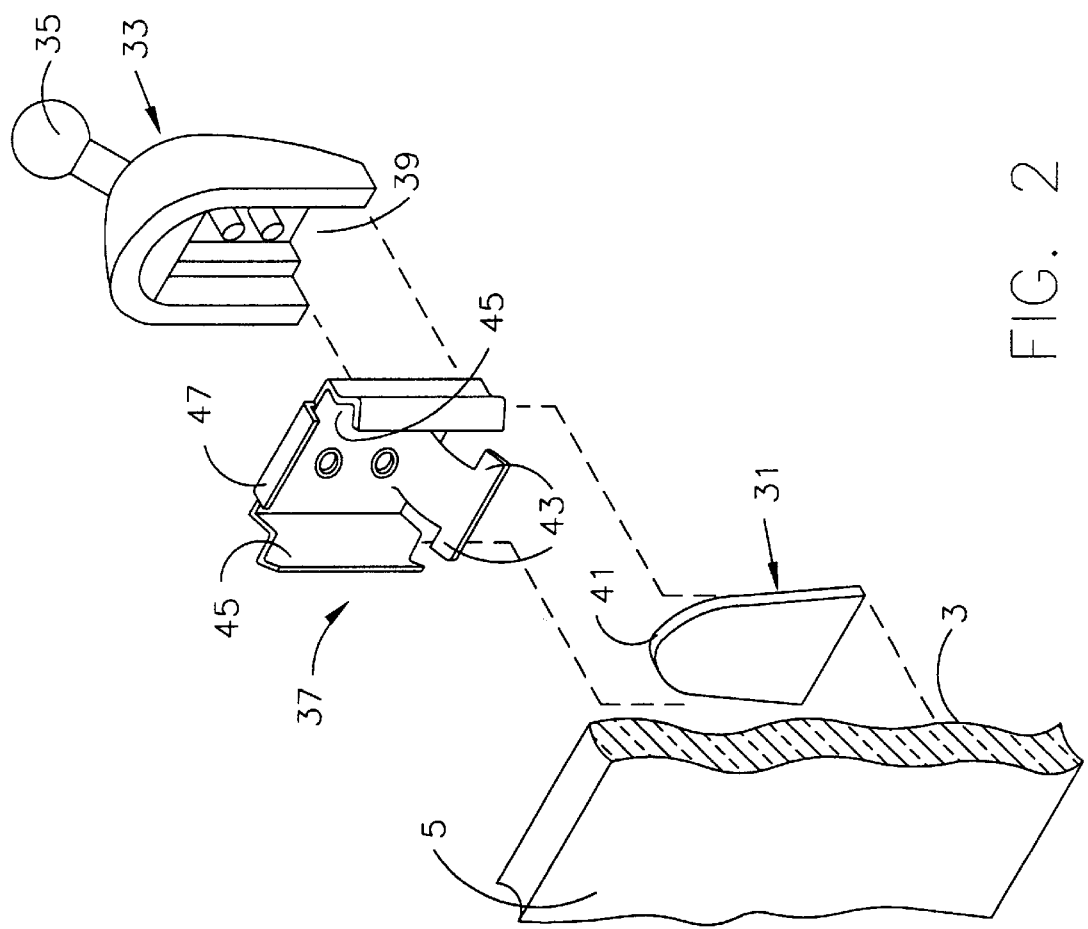

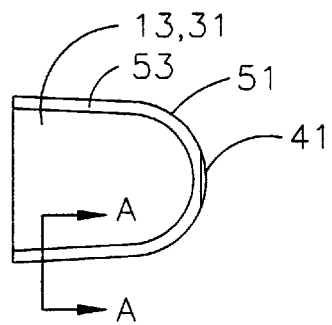
FIG. 3
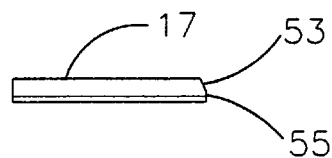
FIG. 4
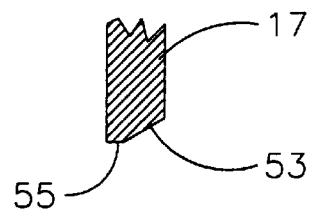
SECTION A—A
FIG. 5
FIG. 6
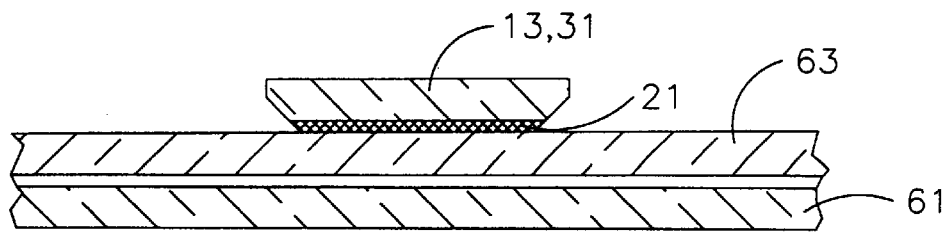

PLASTIC REARVIEW MIRROR MOUNT

This invention relates to a rearview mirror mount for an automobile. More particularly, this invention relates a plastic rearview mirror mount button secured to the interior of an automotive windshield by adhesive or the like.

BACKGROUND OF THE INVENTION

Interior windshield-mounted rearview mirrors are commonly used in most vehicles manufactured and sold throughout the world. Different mirror mounts have been designed for different vehicles. In the United States, for example, supports for conventional windshield-mounted rearview mirrors typically include a base member, known as a "button", which is adhered to the inside of the windshield surface. The button may sometimes have vertically disposed edges forming rails that is/are formed by a bevel on each edge. A support member, known as a "channel mount", may be slidably fitted over the button so that sides of the channel mount engage the rail(s) of the button. The channel mount may include a mounting device such as an arm, ball joint, or other structure for suspending a rearview mirror in the vehicle compartment for use by the driver of the vehicle. A typical mounting assembly, in the United States for example, includes a linkage with a double ball joint for adjusting the mirror relative to the windshield in a variety of positions.

Different shaped mirror mounts, each including a button, are disclosed in, for example, U.S. Pat. Nos. 5,377,948; 5,589,026; 5,487,522; 5,587,236; 5,377,949; 5,100,095; 4,995,581; 4,930,742; and 4,254,931, the disclosures of which are hereby incorporated herein by reference.

Many European vehicles also include mirror mounting structures wherein a button is adapted to receive a complimentary-shaped channel mount with a spring retainer. Rather than being slidably mounted on the button, however, the channel mount in many European vehicles is positioned over the button and then rotated to lock the mount to the windshield button. The button may have a detent which is adapted to receive a tab on the channel mount when the channel mount is rotated to the lock position.

Conventional buttons in rearview mirror mounting structures are made of stainless steel. Such buttons are permanently adhered to the inner surface of a corresponding windshield by way of conventional metal-to-glass adhesive such as polyvinyl butyral (PVB). For example, see the disclosure of U.S. Pat. No. 5,377,948.

Unfortunately, stainless steel buttons are undesirable in that they are very expensive and difficult to manufacture, cannot be made to be as flat as would otherwise be desired, are sometimes prone to falling off of windshields, and require grinding for shaping. Additionally, stainless stell buttons cannot be shaped so as to define sharp corners or bends, which is also undesireable.

It is apparent from the above that there exists a need in the art for a mirror mount button which (i) can be made more cheaply than conventional stainless steel buttons, (ii) can be made flatter than conventional stainless steel buttons; (iii) has a coefficient of expansion closely matched to a glass windshield; (iv) can be shaped as desired so as to include sharp corners for example; and/or (v) can be very securely adhered to an interior surface of a windshield.

It is the purpose of this invention to fulfill any combination, or all, of the above-described needs in the art, as well as other needs which will become apparent to the skilled artisan from the following detailed description of this invention.

SUMMARY OF THE INVENTION

Generally speaking, this invention fulfills the above-described needs in the art by providing a mirror mount for securing a rearview mirror to an interior surface of an automotive windshield, the mirror mount comprising:

an injection molded plastic button secured directly to the interior surface of the windshield by way of an adhesive; and a mirror mounting structure attached to the button, and the rearview mirror attached to the mounting structure.

In certain preferred embodiments, the button includes at least one inclined edge or side surface forming a rail for engagement with a corresponding receiving structure defined by the mirror mounting structure.

This invention further fulfills the above-described needs in the art by providing a method of making an automotive windshield structure, the method comprising the steps of:

laminating first and second glass sheets to one another to form a windshield;

making a plastic rearview mirror mounting button by injection molding a plastic material so as to make the plastic rearview mirror mounting buttons; and adhering the plastic rearview mirror mounting button to an interior surface of the windshield.

This invention further fulfills the above-described needs in the art by providing an automotive windshield structure comprising:

first and second glass sheets laminated together to form a windshield; and a non-metallic plastic button adhered to an interior surface of the windshield by way of an adhesive layer, the plastic button being shaped so as to be adapted to receive thereon a rearview mirror mounting structure whereby a rearview mirror can be mounted to the interior surface of the windshield.

Additionally, the plastic buttons herein conform to and meet Chrysler's mirror mounting specification, which is hereby incorporated herein by reference in its entirety.

This invention will now be described with respect to certain embodiments thereof, along with reference to the accompanying illustrations.

IN THE DRAWINGS

FIG. 1 is a side cross-sectional view of a vehicle windshield and corresponding rearview mirror mounting structure including a plastic button, according to an embodiment of this invention.

FIG. 2 is an exploded perspective view of a mirror and corresponding mounting assembly including a plastic button according to another embodiment of this invention.

FIG. 3 is a top plan view of a plastic button according to any of the aforesaid embodiments of this invention, this button being made by injection molding.

FIG. 4 is a side plan view of the plastic button of FIG. 3.

FIG. 5 is fragmented cross-sectional view of the plastic button of FIG. 3, taken along section line A—A.

FIG. 6 is a side cross sectional view of a windshield including a plastic button adhered thereto, in accordance with an embodiment of this invention.

DETAILED DESCRIPTION OF CERTAIN EMBODIMENTS OF THIS INVENTION

Referring now more particularly to the accompanying drawings in which like reference numerals indicate like parts throughout the several views.

In accordance with different embodiments of this invention, the button in a rearview mirror mounting assembly is made of a non-metal. For example, the button may be made of plastic. In such a manner, injection molding processes may be utilized to make the plastic buttons thereby substantially reducing costs and resulting in more efficient manufacturing techniques than those used with conventional stainless steel buttons. The plastic buttons, adhered to windshields with adhesive, are characterized by good adhesion characteristics, humidity resistive characteristics, good tensile adhesion characteristics at ambient conditions, and satisfactory torque peel characteristics. Still further, the plastic buttons herein are made so as to have major surfaces which can be more flat than similar surfaces on stainless steel buttons, thereby improving adhesion characteristics of the buttons to corresponding windshields. Additionally, the plastic buttons according to certain embodiments of this invention have coefficient(s) of expansions which are satisfactory adjacent glass windshields due to the flexibility of adhesive 21, thereby resulting in good durability and adhesion characteristics of the buttons herein. In certain embodiments, the adhesion characteristics are improved relative to stainless steel buttons because the plastic material which makes up the button(s) has improved reactive or bonding characteristics with regard to the adhesive used to adhere the buttons to the windshield. Yet another advantage associated with plastic buttons according to certain embodiments of this invention is that they can be made via injection molding, thereby enabling the major surface(s) to be more flat than in conventional buttons, and also enabling the buttons to be shaped as desired so that they can define sharp corners or edges if desired.

Referring to the embodiment of FIG. 1, rearview mirror 1 is mounted to the interior surface 3 of laminated automotive windshield 5. Mirror 1 is suspended from the interior surface 3 by stalk 7 and holder (or turtle) 9. Button assembly 11 is mounted directly on interior surface 3 of windshield 5 and designed to releasably engage the mirror. The button assembly includes plastic button 13 including top surface 15, bottom surface 17 which is adhered to the windshield, and opposing side edges. Each of the side edges, in certain embodiments, may be inclined or beveled at an angle with respect to a plane extending through the button generally parallel to top surface 15 and bottom surface 17, so as to engage corresponding tapered or inclined surfaces (not shown) on holder 9. However, it is possible that the side edges need not be beveled. Adhesive layer 21 includes opposing surfaces 23 and 25, with surface 23 in contact with bottom surface 17 of plastic button 13. Adhesive 21 causes plastic button 13 to be permanently secured to the interior surface of windshield 5.

Referring to the embodiment of FIG. 2, button 31 is adhered directly to the interior surface 3 of automotive windshield 5 via an adhesive similar to that shown in FIG. 1. Windshield 5 may be a single sheet of glass, but preferably includes at least two glass sheets laminated together with potentially an intermediate layer(s) therebetween as known in the art. Bracket 33, sometimes also known as a channel mount, is slidably received over button 31 and adjustably supports a rearview mirror mounting arm and rearview mirror in cantilevered fashion so that they project into the vehicle passenger compartment for use by the driver. Ball member 35 projects from bracket 33 and is received in order to mount the rearview mirror on the bracket.

Still referring to the FIG. 2 embodiment, after button 31 is permanently adhered to windshield 5 via an adhesive layer (e.g. see FIG. 6), spring clip 37 is affixed to bracket 33. To assemble bracket 33 and button 31, and consequently mount the rearview mirror on windshield 5, open end 39 of bracket 33 is disposed above top surface 41 of plastic button 31 and moved downwardly toward, over, and around the polymeric button. During this motion, tabs 43 contact the upper surface 15 of button 31 (which is the major button surface facing away from the windshield) and the side inclined or beveled edge surfaces of the button engage corresponding grooves 45. Bracket 33 is then slid therealong, with grooves 45 sliding over and along the inclined or beveled edges of the button, until top surface 41 of button 31 engages stop 47 thereby preventing further sliding of the bracket over or along button 31. In such a manner the rearview mirror may be mounted to the windshield.

The FIG. 1 and FIG. 2 embodiments are for illustrative purposes only, and should not be construed as limiting any aspect of the instant invention. For example, the specific shapes of the polymeric buttons illustrated in FIGS. 1 and 2 may be varied, as injection molding of plastic herein may be used to make buttons of any size and shape, not just those illustrated.

According to any of the aforesaid embodiments of this invention, the button (e.g. 13 or 31) may be made of an injection moldable plastic material such as noryl GTX830. This plastic material is available from General Electric Company, One Plastics Avenue, Pittsfield, Mass. 01201. This plastic material enables the buttons to be made by injection molding, so that the two opposing major surfaces can be more flat than those of conventional stainless steel buttons, and so that any shaped buttons may be efficiently made. With regard to injection pressure, 10,000–20,000 psi should be used in the first stage, and 7,000–13,000 psi in the second stage, with a back pressure of 50–100 psi, a screw speed of 40–80 rpm, and a nozzle size (short open bore) of a minimum orifice of 0.1875 inches. This material has excellent chemical and high heat resistance, and a highest stiffness of 1,200,000 psi flexural modulus. This material has a tensile strength, yield, type I, 0.125 inches, under ASTM D 638, of 22,000 psi, and a tensile strength, break, of approximately 23,000 psi. Its shear strength is approximately 11,000 psi under ASTM D 732. Its specific gravity (solid) is approximately 1.33 under ASTM D 792, and its density approximately 0.048 lbs. per cubic inch under ASTM D 792.

Noryl GTX resin 830-1710 is or includes polyphenylene oxide (CAS# 25134-01-4)/polyamide (nylon 6,6)(CAS# 32131-17-2) polymer blend, glass fiber filled. The product includes primarily high molecular weight polymers. Prior to injection molding, the material is a solid, in plastic pellet form with slight odor. The specific gravity is greater than 1, it is insoluble, and does not exhibit a sharp melting point but instead softens gradually over a wide range of temperature. The softening temperature, Rate B, is approximately 480 degrees F (ASTM D 1525), and the HDT, 66 psi, 0.250", unannealed is approximately 490 degrees F (ASTM D 64B), and the HDT, 264 psi, 0.250", unannealed, is approximately 465 degrees F (ASTM D 64B). The thermal coexpansion is indicated by its CTE, flow, of OF to 300° F., at 1.1–1.7 E-5, in/in-F (ASTM E 831). The density of the product is approximately 0.048 lbs. per cubic inch.

Another plastic material which may be used to make the buttons of any of the aforesaid embodiments is Supec G401, which is 40% gr polyphenylene sulfide. This material also has a high strength, excellent chemical resistance, and is virtually solvent proof. With regard to injection molding, this material should be dried for about three to four hours at 285° F. (0.04% moisture or less). This material is also available from GE (General Electric Company, 1 Plastics Avenue, Pittsfield, Mass. 01201). Yet another material which may be utilized to make plastic buttons is GRIvory GV-6H, also available from GE. The material making up the button may alternatively be made up substantially or significantly (more than 50%) of polyethylene, polycarbonate, polypropylene, polyvinyl chloride, any thermoplastic or modified thermoplastic, thermoplastic elastomeric material, ethylene, PVC, or the like.

Different types of adhesive 21 may be used to adhere any of the aforesaid polymeric buttons 13, 31 to the interior surface of a corresponding windshield. For example, silicone based S-SOTEFA 70 adhesive may be used for this purpose. This adhesive is a silicone elastomer, a solid, colorless, odorless, and includes 0.5 percentage (preferably from about 0 to 5%) by weight methacryloxypropyl trimethoxysilane, 42 percent (preferably from about 30–55%) by weight dimethyl, methylvinyl, methyl treated silica, 2 percent (preferably from about 1–5%) by weight methylhydrogen siloxane, and with regard to supplemental state approximately 55 percent (preferably from about 45–65%) by weight dimethyl, methylvinyl siloxane, dimethylvinyl-terminated. When this or other similar types of adhesive 21 are used to adhere plastic buttons to glass, the coefficient of expansion difference between glass and the plastic button is overcome due to the flexibility of the adhesive (e.g. Sotefa) thereby making the plastic mirror mount feasible and a valuable alternative to conventional steel buttons.

Yet another adhesive which may be used as layer 21 to adhere the buttons herein to the windshield is plasticized polyvinyl butyral, available from Solutia, Inc., 10300 Olive Blvd., St. Louis, Mo. 63166. This material is from about 75–85% by weight polyvinyl butyral and from about 15–25% by weight di-n-hexyl adipate. This material is appears as a flexible plastic film, with a slightly pungent odor, and its product name from Solutia is Saflex™ WG Miltiplastic Interlayer, MSDS No. M00017495. With regard to melting, its softening point is from about 35–150 degrees C., and its specific gravity is from about 1.07–1.08.

While these two adhesives are utilized in preferred embodiments of this invention, it should be recognized than it is anticipated that many other different types of adhesives may be used to adhere plastic buttons to windshields. Thus, these two adhesives should not be viewed as limiting.

Set forth below in Chart 1 are tensile adhesion results and torque peel results of plastic buttons according to different embodiments of this invention. In each of the four examples in Chart 1, the plastic buttons were cleaned, primed, and SOTEFA adhesive applied. The mirror mounts were assembled to the glass, and cured at 141° C. for approximately thirty minutes. Initial samples were tested by tensile adhesion method (SOP3.00.5 inches/minimum pull rate). Additionally, humidity exposed samples were tested by the torque peel method.

As can be seen from Chart 1 above, example numbers 3 and 4 had satisfactory cohesion of the button to the windshield via the adhesive, both with respect to tensile adhesion at ambient conditions and torque peel after the referenced nine weeks. Preferably, according to certain embodiments of this invention, plastic buttons herein have a tensile adhesion at ambient conditions of at least about 300 lbs., more preferably of at least about 320 lbs., and most preferably of at least about 400 lbs. With regard to torque peel characteristics (requiring the aforesaid amount of tourque to disadhere) of plastic buttons herein, they preferably have torque peel requirements of at least about 200 lbs., and most preferably of at least about 250 lbs. at the conditions set forth above in Chart 1.

FIGS. 3–5 illustrate a plastic injection molded button according to any of the aforesaid embodiments of this invention. FIG. 3 is a top plan view of button 13, 31, showing the substantially U-shaped railed edge 51 including inclined or beveled portion 53. As illustrated in FIGS. 4–5, the substantially U-shaped railed edge includes both non-angled vertical edge portion 55 and inclined or angled/beveled portion 53. Vertical portion 55 is substantially perpendicular to both major surface 15 and major surface 17 of the button. Surfaces 15 and 17 are substantially flat or planar. Inclined edge portion 53 is immediately adjacent surface 17 which is adhered directly to the interior surface of the windshield.

Improved flatness of major button surface(s) is a significant advantage of buttons herein over conventional stainless steel buttons. In certain embodiments of this invention, the lowest part of a major surface of the button (e.g. surface 15 or 17) is said to be at zero (0) [i.e. the zero point], and no other part or portion of that major surface rises to an elevation of more than about 0.0070 inches above the zero point, preferably no more than about 0.0050 inches above the zero point, and most preferably no more than about 0.0040 inches above the lowest zero point. Thus, the major surfaces of the button are substantially flat as defined herein because the highest point on each major surface does not deviate with regard to elevation by more than about 0.0070 inches from the lowest point on that surface, preferably not more than about 0.0050 inches deviation, and most preferably not more than about 0.0040 inches deviation in elevation from the lowest to highest point.

Chart 2 set forth below lists six additional examples of plastic buttons made and tested in accordance with different embodiments of this invention.

CHART 1

| Ex. | Plastic Button | Primer | Tensile Adhesion at ambient condition | | Torque peel after 9 weeks at 50 C./98% RH with a 6 lb. load | |
|---|---|---|---|---|---|---|
| | | | (lbs.) | Failure Mode | (lbs.) | Failure Mode |
| 1 | Valox 732E BK1066 Blk | DC 92-023 | 179 | 10–20% coh to button | 200 | 20% coh to button* |
| 2 | Valox 732E BK1066 Blk | DC Primer X | 220 | 10–20% coh to button | 150 | 10% coh to button* |
| 3 | Noryl GTX830 1710 Blk | DC 92-023 | 323 | 50–75% coh to button | 400 | 90% coh to button |
| 4 | Noryl GTX830 1710 Blk | DC Primer X | 410 | 90% coh to button | 250 | 75% coh to button |

CHART 2

| Ex. Plastic | SOTEFA wet out to plastic after cure | Lap Shear (lbs) | Failure Mode |
|---|---|---|---|
| 1 Valox 732E | <50% | 100 | 0% cohesive to plastic |
| Lot #C68204 | <25% | 125 | 0% cohesive to plastic |
| 2 Valox 701 | <50% | 371 | 25% cohesive to plastic |
| Lot #C49252 | <50% | 390 | Plastic broke at fix point |
| 3 Supec G401 | ~75% | 408 | Plastic broke at fix point |
| Lot #EA0412 | ~75% | 527 | Plastic broke at fix point |
| 4 Noryl GTX830 | 98% | 734 | Plastic broke at fix point |
| Lot #N74982 | 98% | | |
| 5 Ultem 2400 | <25% | 269 | 25% cohesive to plastic |
| Lot #UCO371 | <25% | 261 | 10% cohesive to plastic |
| 6 Ultem 2400 | <25% | 349 | 25% cohesive to plastic |
| Lot #UCO371 | | | |

In chart 2 above, SOTEFA Lot # VD056210 adhesive was used to adhere the buttons to the glass windshield. The Lap Shear overlap was approximately 2.25 inches, the width of the adhesive was approximately 0.75 inches, the thickness of the adhesive (SOTEFA) 21 was approximately 0.030 inches, and the adhesive 21 cured for about 30 minutes at about 141 degrees C. In Chart 2, example nos. 3 and 4 showed superior results, with no. 4 (Noryl GTX830 plastic button) having a 98% adhesive to plastic button wet out after cure. Wet out is an indication of the coverage of the total adhesion between the plastic and glass as known in the art. This result shows excellent adherence characteristics, and even caused the plastic to break at the test fix point before it could be disadhered from the glass. Likewise, example no. 3 had a plastic to button wet out of approximately 75% after cure, also illustrating good enough adhesive characteristics that the button broke at the test fix point before it was disadhered from the glass. These excellent wet out characteristics result in part because of the high degree of flatness which all surfaces of the button can have due to the injection molding procedure used to make the plastic buttons. The lap shear characteristics for example nos. 3–4 were also good.

For all embodiments herein, the thickness of the adhesive 21 that secures the buttons to the windshield is from about 0.005 to 0.10 inches, preferably from about 0.010 inches to 0.070 inches, and most preferably from about 0.020 to 0.040 inches thick. The lap shear overlap is from about 2.00 to 2.50 inches in preferred embodiments. The adhesive is allowed to cure for about 20–40 minutes at from about 120 to 160 degrees C. Preferably, plastic buttons herein that are adhered to a windshield have an adhesive wet out to plastic after cure of at least about 70%, more preferably of at least about 75%, and most preferably of at least about 90%. Likewise, plastic buttons herein adhered to windshields have a lap shear of at least about 350 lbs., more preferably a lap shear of at least about 500 lbs., and most preferably a lap shear of at least about 600 lbs. per chart 2 above.

FIG. 6 illustrates an automotive windshield, including a plastic mirror mounting button thereon, in accordance with an embodiment of this invention. As shown the windshield may include first and second glass or plastic sheets laminated to one another via an intermediate layer. Sheets 61 and 63 are preferably of soda-lime-silica type glass or the like, having high visible light transmission characteristics of at least about 70% required for windshields in the United States and/or Europe. Windshield 5 is made by first forming the first and second glass sheets 61 and 63. Then, the sheets 61 and 63 are laminated together and are bent in a known manner into the curved shape required for windshields. Thereafter, a plastic button 13, 31 (according to an embodiment of this invention) is adhered to a surface of the interior glass sheet via an adhesive 21 as shown in FIG. 6 thereby resulting in the illustrated windshield. This windshield may be sold to automotive manufacturers or into the after-market so that rearview mirrors can be attached to the windshield by others simply by sliding a bracket or the like (to have a mirror thereon) over the button.

CHARTS 3–6

Certain examples were conducted as follows. Sotefa adhesive 21 was evaluated on plastic buttons. Three different priming methods for the plastic buttons were evaluated: (1) flame treatment, (2) flame treatment followed by application of primer, and (3) primer. To avoid the formation of bubbles between the plastic buttons and adhesive 21 during the curing phase, the buttons were heat treated prior to each priming method. This involved heating the plastic buttons for approximately 2 hours at 145 degrees C. However, it is possible to heat the buttons in such a manner from 0.5 to 4.0 hours, at a temperature of from about 100–250 degrees C.

As shown in Charts 3–5 below, all three methods of priming produced good adhesion to the plastic. Exposure heat (100 degrees C. for about 250 hours) and humidity (50 degrees C./94% RH for 250 hours) did not affect the adhesion since the failure mode was cohesive to the button. However, the heat did reduce pull values.

Two samples of each priming method were subjected to 24 hours of vibration as defined in Chrysler's mirror mount material specification, incorporated herein by reference. All samples passed the test.

Image stability of the plastic mirror mounts was evaluated by applying a 0.5 g sine sweep from 5 to 100 Hz to the mirror mount system. The system consisted of a Gentex electrochromatic compass mirror attached to the mirror mount. A triaccelerometer was mounted to the center of the mirror to measure the displacement of the mirror in the x, y and z directions during the sine sweep test. A stainless steel buttton with Sotefa was used for comparison. See Chart 6 for the results.

CHART 3

| Button Preparation: | 2 hour heat soak at 145° C. |
| Adhesion system: | Flame treated |
| Adhesive: | 0.030" thick SOTEFA |
| Cure: | 30 mins. at 141° C. |

| Condition | Tensile Adhesion (lbs.) | Failure Mode (% coh to button) |
|---|---|---|
| Ambient | 465 | 100 |
| | 480 | 100 |
| | 481 | 100 |
| | 508 | 100 |
| | 524 | 100 |
| | 500 | 100 |
| | 480 | 100 |
| | 465 | 100 |
| | 506 | 100 |
| | 492 | 100 |
| | 490 ± 19 | |
| Heat Soak: 250 Hr. at 100° C. | 315 | 100 |
| | 315 | 100 |
| | 322 | 100 |
| | 281 | 100 |
| | 324 | 100 |
| | 287 | 95 |
| | 262 | 100 |
| | 260 | 100 |
| | 387 | 100 |
| | 358 | 100 |
| | 311 ± 40 | |
| Humidity with 6 lb. load 250 Hr. at 50° C./94% RH | 417 | 95 |
| | 419 | 100 |
| | 402 | 100 |
| | 420 | 100 |
| | 437 | 100 |

CHART 3-continued

Button Preparation: 2 hour heat soak at 145° C.
Adhesion system: Flame treated
Adhesive: 0.030" thick SOTEFA
Cure: 30 mins. at 141° C.

| Condition | Tensile Adhesion (lbs.) | Failure Mode (% coh to button) |
|---|---|---|
| | 404 | 100 |
| | 408 | 95 |
| | 408 | 100 |
| | 384 | 100 |
| | 410 | 100 |
| | 411 ±0 14 | |
| 24 hour vibration fatigue | pass pass | none none |

CHART 4

Button Preparation: 2 hour heat soak at 145° C.
Adhesion system: Flame treated + Primer
Adhesive: 0.030" thick SOTEFA
Cure: 30 mins. at 141° C.

| Condition | Tensile Adhesion (lbs.) | Failure Mode (% coh to button) |
|---|---|---|
| Ambient | 557 | 100 |
| | 505 | 100 |
| | 519 | 100 |
| | 522 | 100 |
| | 561 | 100 |
| | 480 | 95 |
| | 535 | 100 |
| | 521 | 100 |
| | 381 | 100 |
| | 481 | 100 |
| | 506 ± 52 | |
| Heat Soak: 250 Hr. at 100° C. | 269 | 100 |
| | 263 | 100 |
| | 249 | 100 |
| | 313 | 100 |
| | 311 | 100 |
| | 286 | 100 |
| | 268 | 100 |
| | 426 | 100 |
| | 335 | 100 |
| | 376 | 100 |
| | 310 ± 56 | |
| Humidity with 6 lb. load 250 Hr. at 50° C./94% RH | 433 | 100 |
| | 416 | Glass Broke |
| | 465 | 100 |
| | 432 | 190 |
| | 434 | 100 |
| | 459 | 95 |
| | 436 | 100 |
| | 412 | 100 |
| | 418 | 95 |
| | 399 | 95 |
| | 430 ± 20 | |
| 24 hour vibration fatigue | pass pass | none none |

CHART 5

Button Preparation: 2 hour heat soak at 145° C.
Adhesion system: Primer
Adhesive: 0.030" thick SOTEFA
Cure: 30 mins. at 141° C.

| Condition | Tensile Adhesion (lbs.) | Failure Mode (% coh to button) |
|---|---|---|
| Ambient | 557 | 100 |
| | 505 | 100 |
| | 519 | 100 |
| | 522 | 100 |
| | 568 | 100 |
| | 480 | 100 |
| | 534 | 95 |
| | 521 | 100 |
| | 381 | 100 |
| | 480 | 100 |
| | 507 ± 53 | |
| Heat Soak: 250 Hr. at 100° C. | 255 | 100 |
| | 267 | 95 |
| | 302 | 100 |
| | 283 | 100 |
| | 294 | 95 |
| | 280 | 100 |
| | 260 | 100 |
| | 301 | 100 |
| | 245 | 100 |
| | 326 | 100 |
| | 281 ± 25 | |
| Humidity with 6 lb. load 250 Hr. at 50° C./94% RH | 409 | 100 |
| | 422 | 100 |
| | 429 | 100 |
| | 425 | 100 |
| | 442 | 100 |
| | 420 | 100 |
| | 450 | 100 |
| | 447 | 100 |
| | 446 | 100 |
| | 406 | 100 |
| | 430 ± 16 | |
| 24 hour vibration fatigue | pass pass | none none |

CHART 6

| Priming System | freq (Hz) | acc (g) | disp (in) | freq (Hz) | acc (g) | disp (in) | freq (Hz) | acc1 (gI) | disp (in) |
|---|---|---|---|---|---|---|---|---|---|
| | | | | X Direction: right to left movement | | | | | |
| Standard MM | 15 | 0.11 | 0.009 | 32.5 | 0.038 | 0.001 | 37.8 | 0.27 | 0.004 |
| Flame | 15 | 0.26 | 0.023 | 36.9 | 0.228 | 0.003 | 43.3 | 0.33 | 0.003 |
| | 16 | 0.210 | 0.016 | 35.5 | 0.257 | 0.004 | 45.6 | 0.28 | 0.003 |
| | 16 | 0.26 | 0.019 | 38.1 | 0.115 | 0.002 | 46 | 0.29 | 0.003 |

CHART 6-continued

| Priming System | freq (Hz) | acc (g) | disp (in) | freq (Hz) | acc (g) | disp (in) | freq (Hz) | acc1 (gI) | disp (in) |
|---|---|---|---|---|---|---|---|---|---|
| Flame & | 18 | 0.36 | 0.022 | 37.6 | 0.125 | 0.002 | 46 | 0.420 | 0.004 |
| Primer | 18 | 0.32 | 0.020 | 36.4 | 0.096 | 0.001 | 47.4 | 0.46 | 0.004 |
|  | 18 | 0.32 | 0.020 | 32.5 | 0.072 | 0.001 | 46 | 0.38 | 0.003 |
| Primer | 18 | 0.38 | 0.022 | 35.3 | 0.125 | 0.002 | 42.5 | 0.3 | 0.003 |
|  | 18 | 0.360 | 0.022 | 37.2 | 0.205 | 0.003 | 45.7 | 0.44 | 0.004 |
|  | 18 | 0.36 | 0.021 | 32.5 | 0.115 | 0.002 | 47.8 | 0.45 | 0.0Q4 |
| Y Direction: in and out movement | | | | | | | | | |
| Standard MM | 14 | 0.1 | 0.01 | 21.4 | 0.04 | 0.902 | 58.6 | 0.46 | 0.003 |
| Flame | 14 | 0.12 | 0.013 | 21.9 | 0.04 | 0.002 | 43.7 | 0.4 | 0.004 |
|  | 14 | 0.17 | 0.017 | 21 | 0.06 | 0.003 | 47.1 | 0.4 | 0.004 |
|  | 14 | 0.13 | 0.013 | 23.2 | 0.1 | 0.003 | 45.7 | 0.46 | 0.004 |
| Flame & | 15 | 0.04 | 0.003 | 24.8 | 0.08 | 0.003 | 46.3 | 0.54 | 0.00S |
| Primer | 14 | 0.12 | 0.011 | 24.8 | 0.1 | 0.003 | 46.7 | 0.52 | 0.005 |
|  | 15 | 0.08 | 0.007 | 24.3 | 0.09 | 0.003 | 45.7 | 0.49 | 0.005 |
| Primer | 15 | 0.08 | 0.007 | 25.6 | 0.09 | 0.003 | 43.3 | 0.42 | 0.004 |
|  | 16 | 0.080 | 0.006 | 25.3 | d.09 | 0.003 | 46.3 | 0.47 | 0.004 |

In view of Charts 3–6 above, according to certain embodiments of this invention, the plastic mirror mounting buttons have a tensile adhesion strength to the windshield of at least about 465 lbs. in ambient conditions, and preferably of at least about 500 lbs. in ambient conditions. The plastic buttons, when heat soaked for 250 hours at approximately 100° C., have a tensile adhesion to the windshield of at least about 260 lbs., preferably of at least about 270 lbs., and most preferably of at least about 310 lbs. Meanwhile, when the system is in a humidity with a 6 lb. load on the mounting system for 250 hours at 50° C. (94% relative humidity), the plastic button has a tensile adhesion strength to the windshield of at least about 400 lbs., and preferably of at least about 410 lbs. Additionally, when a primer is utilized (e.g. Chart 4), and the button preparation involves a 2 hour heat soak at approximately 145° C., and the cure is for approximately 30 minutes at approximately 141° C., the tensile adhesion of the plastic button to the windshield is at least about 450 lbs. in certain embodiments of this invention, and more preferably is at least about 505 lbs. in certain embodiments of this invention, in ambient conditions.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A mirror mounting system for securing a rearview mirror to an interior surface of an automotive glass windshield, the mirror mounting system comprising:

an injection molded plastic button to be secured directly to the interior surface of the glass windshield by way of an adhesive;

a mirror mounting structure attached to the button, and the rearview mirror attached to the mounting structure; and wherein said button includes at least one substantially planar major surface that is substantially flat, wherein said at least one major surface is sufficiently flat that the lowest point thereof does not deviate by more than about 0.0070 inches from the highest point thereof, and wherein said button has a tensile adhesion strength to the windshield of at least about 465 lbs.

2. The mirror mounting system of claim 1, wherein said button includes at least one inclined or beveled edge surface forming a rail for engagement with a corresponding receiving structure defined by said mirror mounting structure.

3. The mirror mounting system of claim 2, wherein said inclined surface defines a substantially U-shaped peripheral area of the button.

4. The mirror mounting system of claim 1, wherein said button includes first and second opposing substantially flat major surfaces which are substantially parallel to one another.

5. The mirror mounting system of claim 4, wherein said button further includes an inclined rail edge wall located between said first and second opposing major surfaces, and said inclined rail edge wall being immediately adjacent to at least one of said major surfaces.

6. The mirror mounting system of claim 5, wherein said inclined rail edge wall is angled from about 40°–75° from a plane defined by one of said major surfaces.

7. The mirror mounting system of claim 1, wherein said at least one major surface is sufficiently flat that the lowest point thereof does not deviate by more than about 0.0050 inches from the highest point thereof.

8. The mirror mounting system of claim 7, wherein said at least one major surface is sufficiently flat that the lowest point thereon does not deviate by more than about 0.0040 inches from the highest point thereon.

9. The mirror mounting system of claim 1, wherein the button has a tensile adhesion strength to the windshield of at least about 500 lbs.

10. The mirror mounting system of claim 1, wherein the button has a tensile adhesion strength to the windshield of at least about 270 lbs. if heat soaked for about 250 hours at about 100° C.

11. The mirror mounting system of claim 1, wherein the button has a tensile adhesion to the windshield of at least about 450 lbs. if suscepted to 94% relative humidity and 50° C., with a 6 lb. load on the mounting system, for about 250 hours.

12. A mirror mounting system securing a rearview mirror to an interior surface of an automotive glass windshield, the mirror mounting system comprising:

an injection molded plastic button secured directly to the interior surface of the glass windshield by way of an adhesive;

a mirror mounting structure attached to the button, and the rearview mirror attached to the mounting structure; and wherein said button and said adhesive are provided so as to cause the button to have a tensile adhesion to the windshield of at least about 450 lbs. if exposed to 94% relative humidity and 50 degrees C. with a 6 lb. load, for about 250 hours.

13. The mirror mounting system of claim 12, wherein said adhesive is flexible.

14. A mirror mounting system securing a rearview mirror to an interior surface of an automotive glass windshield, the mirror mounting system comprising:

an injection molded plastic button secured directly to the interior surface of the glass windshield by way of a flexible adhesive;

a mirror mounting structure attached to the button, and the rearview mirror attached to the mounting structure; and wherein said button includes at least one substantially planar major surface that is substantially flat, wherein said at least one major surface is sufficiently flat that the lowest point thereof does not deviate by more than about 0.0070 inches from the highest point thereof, and wherein said button has a tensile adhesion strength to the windshield of at least 450 lbs. if exposed to 94% relative humidity and 50 degrees C. with a 6 lb. load, for about 250 hours.

* * * * *